P. J. GOODWIN.
DEHORNING TOOL.
APPLICATION FILED FEB. 13, 1914.
1,120,473.
Patented Dec. 8, 1914.
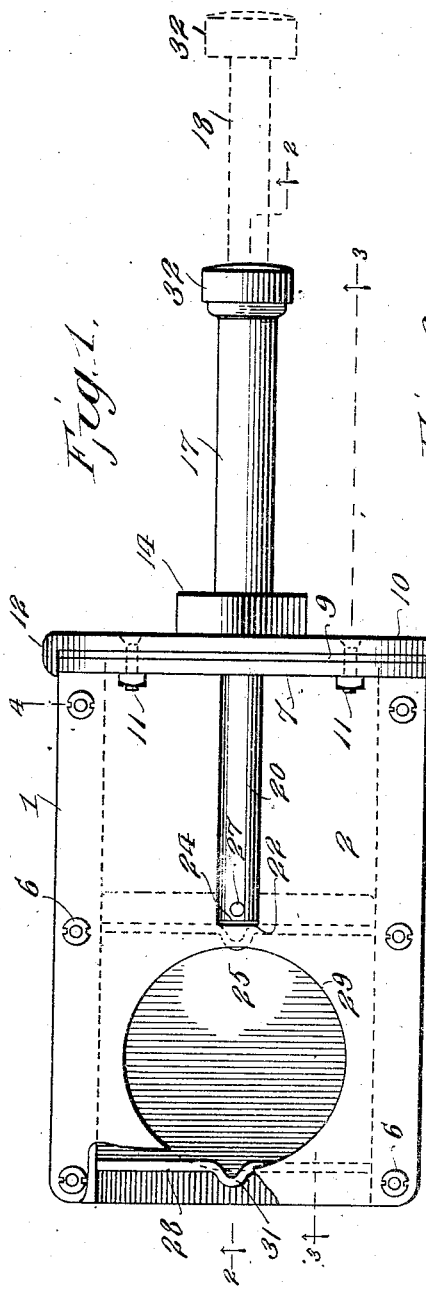
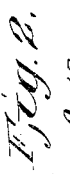
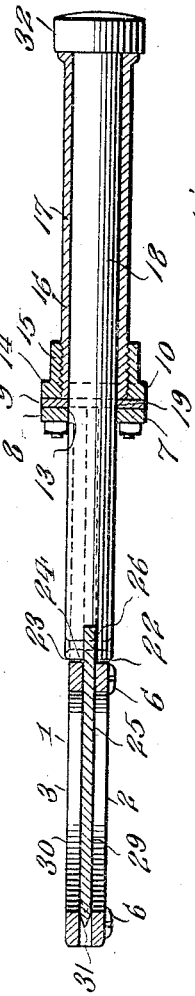
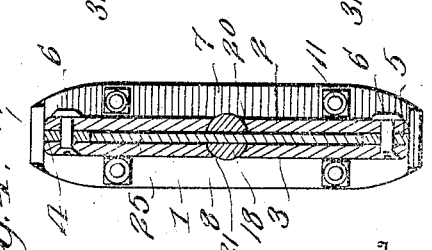
Witnesses
Frank Hough
Dudley B. Howard
Inventor
Paul J. Goodwin,
By Victor J. Evans
Attorney

UNITED STATES PATENT OFFICE.

PAUL J. GOODWIN, OF HURDSFIELD, NORTH DAKOTA.

DEHORNING-TOOL.

1,120,473.   Specification of Letters Patent.   Patented Dec. 8, 1914.

Application filed February 13, 1914. Serial No. 818,600.

*To all whom it may concern:*

Be it known that I, PAUL J. GOODWIN, a citizen of the United States, residing at Hurdsfield, in the county of Wells and State of North Dakota, have invented new and useful Improvements in Dehorning-Tools, of which the following is a specification.

This invention relates to a device for use in dehorning cattle.

In using the ordinary dehorning clipper, there is danger of tearing and crushing the horn particularly when the animal becomes fractious, and whenever the animal twists his head, it is necessary to hold the clippers in such a manner that this movement will be resisted and to apply the necessary pressure at the same time in order to sever the horn, which usually results in straining the blades of the implement.

It is the purpose of my invention to provide a dehorning implement which includes a chisel adapted to be operated by a mallet, and which is constructed so that unruly movement on the part of the animal being operated upon will not affect the cutting operation to an annoying or dangerous degree.

My device may be used efficiently without the necessity of placing the animal in stocks or a rack.

A further object of the invention is to provide a dehorning implement of the character set forth whose chisel is constructed so that it will sever the horn without crushing the same and will make a clean cut.

A still farther object is to provide a dehorning device which is constructed of few parts which are formed and arranged in such a manner that the chisel blade may be removed conveniently for the purpose of sharpening or replacing the same, and which will be durable and efficient in operation and inexpensive in the cost of manufacture.

The invention consists in the features of construction, combination, and arrangement of parts, hereinafter fully described and claimed, reference being had to the accompanying drawing in which:

Figure 1 is a front elevation of the device, one position of the chisel being shown in dotted lines; Fig. 2 is a longitudinal sectional view on line 2—2 of Fig. 1; Fig. 3 is a similar view on line 3—3 of Fig. 1; and Fig. 4 is a transverse sectional view on line 4—4 of Fig. 1.

In the drawing, the numeral 1 designates the flat, rectangular body of the device which is constructed of elongated plates 2 and 3. These plates are of metal, such as steel or iron, and are disposed coextensive with each other, being maintained in spaced parallel relation by the longitudinal spacing strips 4 and 5 which are interposed between the plates at the side edges thereof. The plates 2 and 3 are detachably connected by means of the bolt member 6, which extend through the said plates and the spacing strips, just described. The plates 2 and 3 are provided at one end of the body with lateral flanges 7 and 8 respectively, which are formed by bending the corresponding edges of the plates outwardly at right angles thereto. A reinforcing plate 9 is adapted to fit against the outer faces of the said flanges and to be secured between the said flanges and a transversely extending head plate 10 by means of the bolt members 11, which extend through alining openings provided in the said plates and the body flanges. Inbent flanges 12 are formed terminally upon the head plate so as to overlie the ends of the body flanges and the reinforcing plate. The said head plate is provided medially with a circular opening 13 extending longitudinally with respect to the body 1, and has a boss 14 formed medially upon its outer face. This boss has a longitudinal opening 15 therein disposed in alinement with the plate opening 13 and being larger in diameter than the same. This boss opening is screw-threaded for the reception of the threaded inner end 16 of a tubular guide member 17, in which a cylindrical operating stem 18 for the chisel, which will be described presently, is mounted for longitudinal reciprocation. The inner end portion of this stem is adapted for sliding movement through the head plate opening 13, the alining opening 19 provided in the reinforcing plate 9, and the longitudinally extending, medial slots 20 and 21 of the body plates 2 and 3 respectively, the said slots being disposed in registration with each other and having their longitudinal walls concaved transversely concentric with the stem. The inner end walls 22 and 23 of the slots 20 and 21 respectively, are adapted to serve as limiting faces for engagement with the inner end face 24 of the stem.

A flat chisel blade 25 is mounted for longitudinal sliding movement within the guide way formed between the body plates 2 and 3 with its parallel side edges frictionally engaging the spacing strips 4 and 5. The inner edge of the blade 25 is secured medially within the transverse slot 26 provided in the inner end of the stem 18 by means of the pin 27, it being understood that this edge of the blade bears squarely against the inner wall of the stem slot so that no strain will be sustained by the securing pin 27 during the driving operation of the chisel which will be described fully hereinafter. The opposite, outer edge 28 of the blade 25, which extends at right angles to the longitudinal axis of the body 1, is sharpened so as to provide a cutting edge. The body plates 2 and 3 are provided with alining circular openings 29 and 30 of large diameter, which define a mouth through which the cutting edge 28 of the chisel blade is movable. The said blade is provided medially upon its cutting edge with an outward projection 31 which has a rounded, sharpened cutting face.

A striking head 32 is provided upon the outer end of the chisel stem 18 for engagement by a heavy mallet, or similar operating implement (not shown). In the operation of the device in dehorning cattle, the horn is inserted through the mouth of the instrument provided by the body openings 29 and 30, when the chisel blade is in the position indicated by the dotted lines in Fig. 1 of the drawing. When the device has been adjusted upon the horn so that the projection 31 upon the cutting edge of the chisel engages the horn at the proper point thereon, the body of the device is held in position by grasping the tubular member 17 as a handle with one hand, and the other hand is used to strike the head 32 of the operating stem 13 forcibly with a heavy mallet, or the like. The projection 31 of the chisel will penetrate the horn first and then the straight cutting edges thereof will complete the cutting operation easily and without danger of crushing or splintering the horn, owing to this peculiar construction of cutting edge. Should the animal become fractious and endeavor to resist the operation, no harm could result to the animal nor to the dehorning implement, owing to the manner in which the latter is applied to the horn, as permitted by the construction of the body of the device and the arrangement of the chisel therein.

What is claimed is:

1. A device of the class described comprising a body having an opening therein defining a mouth, a cutting element movably mounted within the said body and being adapted to traverse the said mouth, the said cutting element being in the form of a flat blade having a transversely extending, straight cutting edge, and a medial projection formed upon the said cutting edge, the said projection being rounded transversely and sharpened to form a cutting edge disposed in the plane of the main cutting edge.

2. A device of the class described comprising a body having a guide slot therein and a lateral opening in communication therewith to define a mouth, a chisel blade slidably mounted within the said slot and having a cutting edge, a tubular guide member connected with the said body in communication with its guide slot, and an operating stem slidably mounted within the said guide member and being connected at its inner end with the said blade.

3. A device of the class described comprising a body having a guide slot therein and a lateral opening in communication therewith to define a mouth, a chisel blade slidably mounted within the said slot and having a cutting edge, a tubular guide member connected with the said body in communication with its guide slot, an operating stem slidably mounted within the said guide member and being connected at its inner end with the said blade, and a striking head formed upon the outer end of the said stem.

4. A device of the class described comprising an elongated body including a pair of relatively spaced, coextensive plates, and a pair of spacing strips interposed between said plates at the side edges of the same, the edges of said plates at one end of the body being bent laterally to provide oppositely extending flanges, a head plate secured detachably to the outer faces of the said flanges and being provided medially with an opening in communication with the interior of the body, the body plates being provided with alining, longitudinal slots in prolongation of the head plate opening, and being provided further with a pair of lateral openings alining with each other to define a mouth, a tubular guide member connected with the said head plate in registration with its opening, an operating stem reciprocally mounted within the said guide member and the body plate slots with its inner end engageable with the inner walls of the said slots, and a chisel blade connected with the inner end of said stem and being longitudinally movable between the plates of the body.

5. A device of the class described comprising an elongated body including a pair of relatively spaced, coextensive plates, and a pair of spacing strips interposed between said plates at the side edges of the same, the edges of the said plates at one end of the body being bent laterally to provide oppositely extending flanges, a head plate secured detachably to the outer faces of the said flanges and being provided medially with an opening in communication with the interior of the body, the body plates being provided with alining, longitudinal slots in prolongation of the head plate opening and being provided further with a pair of lateral openings alining with each other to define a mouth, a tubular guide member connected with the said head plate in registration with its opening, an operating stem reciprocally mounted within the said guide member and the body plate slots with its inner end engageable with the inner walls of the said slots, a chisel blade connected with the inner end of said stem and being longitudinally movable between the plates of the body, and inbent flanges formed upon the opposite ends of the said head plate overlying the ends of the body plate flanges.

In testimony whereof I affix my signature in presence of two witnesses.

PAUL J. GOODWIN.

Witnesses:
J. C. REINERTSON,
A. T. GILTNER.